(12) United States Patent
Hirose et al.

(10) Patent No.: US 10,873,082 B2
(45) Date of Patent: Dec. 22, 2020

(54) NEGATIVE ELECTRODE ACTIVE MATERIAL, NEGATIVE ELECTRODE, LITHIUM ION SECONDARY BATTERY, METHOD OF USING LITHIUM ION SECONDARY BATTERY, METHOD OF PRODUCING NEGATIVE ELECTRODE ACTIVE MATERIAL, AND METHOD OF PRODUCING LITHIUM ION SECONDARY BATTERY

(71) Applicant: SHIN-ETSU CHEMICAL CO., LTD., Tokyo (JP)

(72) Inventors: Takakazu Hirose, Annaka (JP); Reiko Sakai, Takasaki (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 106 days.

(21) Appl. No.: 16/090,906

(22) PCT Filed: May 16, 2017

(86) PCT No.: PCT/JP2017/018352
§ 371 (c)(1),
(2) Date: Oct. 3, 2018

(87) PCT Pub. No.: WO2018/008260
PCT Pub. Date: Jan. 11, 2018

(65) Prior Publication Data
US 2019/0123353 A1    Apr. 25, 2019

(30) Foreign Application Priority Data
Jul. 4, 2016 (JP) .................................. 2016-132892

(51) Int. Cl.
*H01M 4/00* (2006.01)
*H01M 4/58* (2010.01)
(Continued)

(52) U.S. Cl.
CPC ......... *H01M 4/5825* (2013.01); *C01B 33/113* (2013.01); *C01B 33/32* (2013.01);
(Continued)

(58) Field of Classification Search
CPC ... C01P 2004/61; C01P 2002/74; H01M 4/36; H01M 4/136; H01M 4/48
See application file for complete search history.

(56) References Cited

U.S. PATENT DOCUMENTS 5,395,711 A     3/1995  Tahara et al.
7,459,236 B2   12/2008  Konishiike et al.
(Continued)

FOREIGN PATENT DOCUMENTS

EP    2 343 758 A1    7/2011
JP      2997741 B2    1/2000
(Continued)

OTHER PUBLICATIONS

Aug. 8, 2017 Search Report issued in International Patent Application No. PCT/JP2017/018352.
(Continued)

*Primary Examiner* — Cynthia H Kelly
*Assistant Examiner* — Monique M Wills
(74) *Attorney, Agent, or Firm* — Oliff PLC (57) ABSTRACT

A negative electrode active material including a negative electrode active material particle; the negative electrode active material particle including a silicon compound shown by $SiO_x$ ($0.5 \leq x \leq 1.6$), wherein at least part of the $Si^{4+}$ contained in the negative electrode active material particle is to be changed to at least one state selected from valence states of $Si^{y+}$ (y is any of 0, 1, 2, and 3) in occlusion of Li in the negative electrode active material. This provides a negative electrode active material that is capable of increasing battery capacity and improving cycle performance when
(Continued)

it is used as a negative electrode active material for a secondary battery.

14 Claims, 2 Drawing Sheets

(51) Int. Cl.

| | |
|---|---|
| *H01M 4/136* | (2010.01) |
| *C01B 33/113* | (2006.01) |
| *H01M 10/44* | (2006.01) |
| *H01M 4/48* | (2010.01) |
| *H01M 4/66* | (2006.01) |
| *H01M 4/36* | (2006.01) |
| *C01B 33/32* | (2006.01) |
| *H01M 4/62* | (2006.01) |
| *H01M 10/0525* | (2010.01) |
| *H01M 4/02* | (2006.01) |

(52) U.S. Cl.
CPC ............ *H01M 4/136* (2013.01); *H01M 4/36* (2013.01); *H01M 4/366* (2013.01); *H01M 4/48* (2013.01); *H01M 4/625* (2013.01); *H01M 4/66* (2013.01); *H01M 10/0525* (2013.01); *H01M 10/44* (2013.01); *C01P 2002/74* (2013.01); *C01P 2004/61* (2013.01); *C01P 2004/62* (2013.01); *C01P 2004/80* (2013.01); *C01P 2006/40* (2013.01); *H01M 2004/021* (2013.01); *H01M 2004/027* (2013.01)

(56) References Cited

U.S. PATENT DOCUMENTS

| | | | |
|---|---|---|---|
| 8,377,592 | B2 | 2/2013 | Jeong et al. |
| 2006/0099507 | A1 | 5/2006 | Kogetsu et al. |
| 2008/0176137 | A1 | 7/2008 | Endo et al. |
| 2009/0047577 | A1 | 2/2009 | Iwamoto et al. |
| 2009/0202911 | A1 | 8/2009 | Fukuoka et al. |
| 2011/0159368 | A1 | 6/2011 | Hirose et al. |
| 2012/0326500 | A1 | 12/2012 | Hirose et al. |
| 2013/0157127 | A1* | 6/2013 | Hirose .................. B60L 53/65 429/211 |
| 2013/0224600 | A1 | 8/2013 | Yasuda et al. |
| 2015/0118548 | A1* | 4/2015 | Suguro ................ C07D 207/20 429/188 |
| 2016/0233484 | A1 | 8/2016 | Hirose et al. |
| 2017/0117535 | A1* | 4/2017 | Yoon ..................... H01M 4/587 |

FOREIGN PATENT DOCUMENTS

| | | |
|---|---|---|
| JP | 2001-185127 A | 7/2001 |
| JP | 2002-042806 A | 2/2002 |
| JP | 2005-183264 A | 7/2005 |
| JP | 2006-114454 A | 4/2006 |
| JP | 2006-164954 A | 6/2006 |
| JP | 2007-234255 A | 9/2007 |
| JP | 2008-177346 A | 7/2008 |
| JP | 2008-251369 A | 10/2008 |
| JP | 2008-282819 A | 11/2008 |
| JP | 2009-070825 A | 4/2009 |
| JP | 2009-205950 A | 9/2009 |
| JP | 2009-212074 A | 9/2009 |
| JP | 2011-233497 A | 11/2011 |
| JP | 2012-164481 A | 8/2012 |
| JP | 2015-156355 A | 8/2015 |
| WO | 2007/063765 A1 | 6/2007 |
| WO | 2012/049826 A1 | 4/2012 |
| WO | 2013/175715 A1 | 11/2013 |
| WO | 2015/025443 A1 | 2/2015 |

OTHER PUBLICATIONS

Yamada, Masayuki et. al., "Reaction Mechanism of "SiO"-Carbon Composite-Negative Electrode for High-Capacity Lithium-Ion Batteries", Journal of the Electrochemical Society, Aug. 29, 2012, vol. 159, Issue 10, pp. A1630-A1635.
Jan. 8, 2019 International Preliminary Report on Patentability issued in International Patent Application No. PCT/JP2017/018352.
Database WPI Week 200518 Thomson Scientific, London, GB; AN 2015-144674 XP002796992.
Jan. 27, 2020 Extended Search Report issued in European Patent Application No. 17823868.9.
Mar. 26, 2019 Office Action issued in Japanese Patent Application No. 2016-132892.
Sep. 1, 2020 Office Action issued in European Patent Application No. 17823868.9.
Jul. 9, 2020 Office Action issued in Taiwanese Patent Application No. 106116980.

* cited by examiner

NEGATIVE ELECTRODE ACTIVE MATERIAL, NEGATIVE ELECTRODE, LITHIUM ION SECONDARY BATTERY, METHOD OF USING LITHIUM ION SECONDARY BATTERY, METHOD OF PRODUCING NEGATIVE ELECTRODE ACTIVE MATERIAL, AND METHOD OF PRODUCING LITHIUM ION SECONDARY BATTERY

TECHNICAL FIELD

The present invention relates to a negative electrode active material, a negative electrode, a lithium ion secondary battery, a method of using the lithium ion secondary battery, a method of producing a negative electrode active material, and a method of producing a lithium ion secondary battery.

BACKGROUND ART

In recent years, small electronic devices, represented by mobile terminals, have been widely used and urgently required to reduce the size and weight and to increase the life. Such requirement has advanced the development of particularly small, lightweight secondary batteries with higher energy density. These secondary batteries are considered to find application not only for small electronic devices but for large electronic devices such as, typically, automobiles as well as power storage systems such as, typically, houses.

Among those, lithium-ion secondary batteries are easy to reduce the size and increase the capacity and have higher energy density than those of lead or nickel-cadmium batteries, receiving considerable attention.

The lithium-ion secondary battery has positive and negative electrodes, a separator, and an electrolyte. The negative electrode includes a negative electrode active material related to charging and discharging reactions.

A negative electrode active material, which is usually made of a carbon-based active material, is required to further improve the battery capacity for recent market requirement. Use of silicon as a negative electrode active material is considered to improve the battery capacity, for silicon has a logical capacity (4199 mAh/g) ten times larger than does graphite (372 mAh/g). Such a material is thus expected to significantly improve the battery capacity. The development of silicon materials for use as negative electrode active materials includes not only silicon as a simple but also alloy thereof and a compound thereof such as typically oxides. The consideration of active material shapes for carbon-based active materials ranges from a standard application type to an integrated type in which the materials are directly accumulated on a current collector.

Use of silicon as a main material of a negative electrode active material, however, expands or shrinks a negative electrode active material when charging or discharging, thereby making the negative electrode active material easy to break particularly near its surface layer. In addition, this active material produces ionic substances in its interior and is thus easy to break. The breakage of the surface layer of the negative electrode active material creates a new surface, increasing a reaction area of the active material. The new surface then causes the decomposition reaction of an electrolyte and is coated with a decomposition product of the electrolyte, thereby consuming the electrolyte. This makes the cycle performance easy to reduce.

Various materials and configurations of a negative electrode for a lithium-ion secondary battery mainly using a silicon material have been considered to improve the initial efficiency and the cycle performance of the battery.

More specifically, a vapor deposition method is used to accumulate silicon and amorphous silicon dioxide simultaneously so that better cycle performance and greater safety are achieved (See Patent Document 1, for example). Moreover, a carbon material (an electronic conduction material) is disposed on the surface of silicon oxide particles so that a higher battery capacity and greater safety are achieved (See Patent Document 2, for example). Moreover, an active material including silicon and oxygen is produced to form an active material layer having a higher ratio of oxygen near a current collector so that improved cycle performance and higher input-output performance are achieved (See Patent Document 3, for example). Moreover, silicon active material is formed so as to contain oxygen with an average content of 40 at % or less and with a higher oxygen content near a current collector so that improved cycle performance is achieved (See Patent Document 4, for example).

Moreover, a nano-complex including Si-phase, $SiO_2$, $M_yO$ metal oxide is used to improve the first charge and discharge efficiency (See Patent Document 5, for example). To improve the cycle performance, $SiO_x$ ($0.8 \leq x \leq 1.5$, the range of particle size=1 μm to 50 μm) and a carbon material are mixed and calcined at a high temperature (See Patent Document 6, for example). The active material is controlled by adjusting a mole ratio of oxygen to silicon in a negative electrode active material in the range from 0.1 to 1.2 so as to hold a difference between the maximum and the minimum of the oxygen-to-silicon mole ratio near the interface between the active material and a current collector at 0.4 or less, so that improved cycle performance is achieved (See Patent Document 7, for example). Moreover, a metal oxide containing lithium is used to improve the battery load characteristic (See Patent Document 8, for example). To improve the cycle performance, a hydrophobic layer such as a silane compound layer is formed on the surface of a silicon material (See Patent Document 9, for example). Moreover, a silicon oxide is used and coated with graphite coating to give electric conductivity so that improved cycle performance is achieved (See Patent Document 10, for example). In Patent Document 10, the graphite coating exhibits a Raman spectrum that has broad peaks at shift values of 1330 $cm^{-1}$ and 1580 $cm^{-1}$, and their intensity ratio $I_{1330}/I_{1580}$ satisfies $1.5 < I_{1330}/I_{1580} < 3$. Similarly, a particle having a silicon microcrystal phase dispersed in a silicon dioxide is used to achieve a higher battery capacity and improved cycle performance (See Patent Document 11, for example). Moreover, a silicon oxide having a silicon-to-oxygen atomicity ratio of 1:y ($0 < y < 2$) is used to improve overcharge and overdischarge performance (See Patent Document 12, for example).

CITATION LIST

Patent Literature

Patent Document 1: Japanese Unexamined Patent publication (Kokai) No. 2001-185127
Patent Document 2: Japanese Unexamined Patent publication (Kokai) No. 2002-042806
Patent Document 3: Japanese Unexamined Patent publication (Kokai) No. 2006-164954
Patent Document 4: Japanese Unexamined Patent publication (Kokai) No. 2006-114454

Patent Document 5: Japanese Unexamined Patent publication (Kokai) No. 2009-070825
Patent Document 6: Japanese Unexamined Patent publication (Kokai) No. 2008-282819
Patent Document 7: Japanese Unexamined Patent publication (Kokai) No. 2008-251369
Patent Document 8: Japanese Unexamined Patent publication (Kokai) No. 2008-177346
Patent Document 9: Japanese Unexamined Patent publication (Kokai) No. 2007-234255
Patent Document 10: Japanese Unexamined Patent publication (Kokai) No. 2009-212074
Patent Document 11: Japanese Unexamined Patent publication (Kokai) No. 2009-205950
Patent Document 12: Japanese Patent No. 2997741

SUMMARY OF INVENTION

Technical Problem

As described above, small electronic devices, represented by mobile devices, have been advancing recently toward high performance and multifunction, and a lithium ion secondary battery that is main electric source thereof is required to improve a battery capacity. As a technique to solve this problem, it is desired to develop a lithium ion secondary battery containing a negative electrode using a silicon material as a main material. Further, for a lithium ion secondary battery using a silicon material, it is desired to show a cycle performance almost equivalent to that of a lithium ion secondary battery using a carbon-based active material. However, it is not reached the stage to propose a negative electrode active material which shows a cycle stability equivalent to that of a lithium ion secondary battery using a carbon-based active material.

Among the silicon materials, silicon oxide is a material to exhibit good properties, and is nearing application to products actually. However, the silicon oxide undergoes disproportionation to Si and Li by repeating charging and discharging, thereby causing enlargement of Si. Due to this enlargement of Si, the silicon oxide exhibits degradation behavior similar to metallic Si and Si alloy. The silicon oxide allows the battery to largely elongate the cycle performance compared to metallic Si and so on, but has not yet been prevented from degradation due to longer cycle.

The present invention was accomplished in view of the above-described problems. It is an object of the present invention to provide a negative electrode active material that is capable of increasing battery capacity and improving cycle performance when it is used as a negative electrode active material for a secondary battery, a negative electrode containing this negative electrode active material, a lithium ion secondary battery using this negative electrode, and a method of producing this lithium ion secondary battery. The object also includes to provide a method of producing a negative electrode active material that is capable of increasing battery capacity and improving cycle performance. The object further includes to provide a method of producing a lithium ion secondary battery using such a negative electrode active material.

Solution to Problem

To solve the problem, the present invention provides a negative electrode active material containing a negative electrode active material particle;

the negative electrode active material particle comprising a silicon compound shown by $SiO_x$ ($0.5 \le x \le 1.6$),
wherein the negative electrode active material particle contains $Si^{4+}$, and at least part of the $Si^{4+}$ is to be changed to at least one state selected from valence states of $Si^{y+}$ (y is any of 0, 1, 2, and 3) in occlusion of Li in the negative electrode active material.

The inventive negative electrode active material contains a negative electrode active material particle containing a silicon compound ($SiO_x$: $0.5 \le x \le 1.6$; hereinafter, also referred to as silicon oxide), and has high battery capacity thereby. The silicon oxide contained in this negative electrode active material particle actually has a silicon dioxide ($SiO_2$) component and a silicon (Si) component. In the present invention, at least part of $Si^{4+}$ in the silicon dioxide ($SiO_2$) component changes the valence number to be less than 4 ($Si^{y+}$) in occluding Li, and this $Si^{y+}$ can function as an active material to occlude and release Li, together with Si originally contained in the negative electrode active material particle. This makes it possible to prevent the silicon oxide ($SiO_x$) from disproportionation to Si and Li silicate due to charging and discharging. It also makes it possible to prevent a reaction of Si alone to prevent enlargement of the Si. As a result, good cyclic characteristics are successfully obtained.

The negative electrode active material particle is preferably the one to form a state of $Si^{0+}$ by occlusion and release of Li in the negative electrode active material.

The negative electrode active material like this makes it possible to further prevent the silicon oxide from disproportionation to Si and Li silicate due to charging and discharging, and to obtain stable battery properties.

In this case, the $Si^{0+}$ is preferably amorphous Si.

The negative electrode active material that contains Si with lower crystallinity like this makes it possible to further prevent the silicon oxide from disproportionation to Si and Li silicate due to charging and discharging.

The $Si^{y+}$ may include $Si^{z+}$ (z is any of 1, 2, and 3) that can be in a form of a Li compound after the occlusion of Li in the negative electrode active material.

The negative electrode active material like this is able to present in a form of a Li compound to act as an active material when the $Si^{z+}$ occludes Li.

The negative electrode active material preferably has at least one kind of shoulder peak in a range of an energy more than 1841 eV and 1845 eV or less in a XANES spectrum obtained by XANES measurement performed such that a first secondary battery having a negative electrode containing the negative electrode active material and a positive electrode containing a positive electrode active material is subjected to 100 cycles of charging and discharging, followed by disassembling the first secondary battery subjected to the charging and discharging, and producing a second secondary battery having the negative electrode subjected to the charging and discharging together with a counter electrode composed of metallic Li to set the second secondary battery to have an open-circuit potential of 2.0 V, and then the negative electrode is taken out from the second secondary battery and subjected to the XANES measurement.

The shoulder peak in the above range is originated from $Si^{z+}$. Accordingly, the negative electrode active material like this contains larger amount of $Si^{z+}$ to make $Si^{z+}$ easy to function as an active material. This makes it possible to prevent the silicon oxide ($SiO_x$) from disproportionation to Si and Li silicate due to charging and discharging.

It is preferred that the $Si^{y+}$ include $Si^{z+}$ (z is any of 1, 2, and 3), and the $Si^{4+}$ and the $Si^{z+}$ be to be reversibly changed to each other in the negative electrode active material particle in repeating of occlusion and release of Li in the negative electrode active material.

The reversible change of the $Si^{z+}$ like this makes it possible to further prevent a reaction of Si alone to prevent enlargement of the Si.

The negative electrode active material particle preferably has a median diameter of 0.5 µm or more and 20 µm or less.

When the median diameter of the negative electrode active material particle is in the above range, more favorable cycle performance and initial charge/discharge efficiency are obtained using the negative electrode active material containing the negative electrode active material particle like this as a negative electrode active material for a lithium ion secondary battery.

The negative electrode active material particle preferably has a surface layer portion containing a carbon material.

When the negative electrode active material particle has a carbon material at the surface layer as described above, the electric conductivity is improved. Accordingly, it is possible to improve the battery property using a negative electrode active material containing the negative electrode active material particle like this as a negative electrode active material for a lithium ion secondary battery.

The average thickness of the carbon material is preferably 5 nm or more and 5000 nm or less.

When the average thickness of the carbon material for covering is 5 nm or more, the electric conductivity is successfully improved. When the average thickness of the carbon material for covering is 5000 nm or less, it is possible to prevent lowering of the battery capacity in the use of the negative electrode active material containing the negative electrode active material particle like this as a negative electrode active material for a lithium ion secondary battery.

The present invention further provides a negative electrode comprising the negative electrode active material of the present invention.

When the negative electrode like this is used as a negative electrode for a lithium ion secondary battery, higher battery capacity and favorable cycle performance are obtained.

The negative electrode preferably include:
a negative electrode active material layer containing the negative electrode active material described above, and
a negative electrode current collector, wherein the negative electrode active material layer is formed on the negative electrode current collector, and
the negative electrode current collector contains carbon and sulfur, and each content is 100 ppm by mass or less.

When the negative electrode current collector to compose the negative electrode contains carbon and sulfur in amounts described above, it is possible to prevent the negative electrode from deformation in charging.

The present invention further provides a lithium ion secondary battery, comprising the negative electrode of the present invention as a negative electrode.

The lithium ion secondary battery using the negative electrode like this makes it possible to give higher battery capacity and favorable cycle performance.

The present invention further provides a method of using the lithium ion secondary battery of the present invention, comprising:
setting a final voltage of the lithium ion secondary battery so as to use the negative electrode in a range of potential lower than the value at an inflection point formed near 0.7 V of a discharge curve obtained from a secondary battery having the negative electrode and a counter electrode composed of metallic Li.

The usage like this makes it possible to further prevent the silicon oxide from disproportionation to Si and Li silicate due to charging and discharging in the negative electrode active material contained in the negative electrode of the lithium ion secondary battery.

The present invention further provides a method of producing a negative electrode active material containing a negative electrode active material particle, comprising the steps of:
preparing negative electrode active material particles each containing a silicon compound shown by a general formula $SiO_x$ (0.5≤x≤1.6); and
selecting a negative electrode active material particle containing $Si^{4+}$ in which at least part of the $Si^{4+}$ is to be changed to at least one state selected from valence states of $Si^{y+}$ (y is any of 0, 1, 2, and 3) in Li occlusion in the negative electrode active material.

The production of a negative electrode active material by selecting a negative electrode active material particle as described above makes it possible to produce a negative electrode active material with higher capacity and favorable cycle performance when it is used as a negative electrode active material for a lithium ion secondary battery.

The present invention further provides a method of producing a lithium ion secondary battery, comprising:
producing a negative electrode using a negative electrode active material produced by the inventive method of producing a negative electrode active material, and
producing a lithium ion secondary battery using the produced negative electrode.

This manufacturing process makes it possible to produce a lithium ion secondary battery with higher capacity and favorable cycle performance using the negative electrode active material containing the negative electrode active material particle selected as described above.

Advantageous Effects of Invention

The inventive negative electrode active material brings high capacity and favorable cycle performance when it is used as a negative electrode active material for a lithium ion secondary battery. The inventive method of producing a negative electrode active material makes it possible to produce a negative electrode active material for a lithium ion secondary battery with favorable cycle performance. The inventive method of using the lithium ion secondary battery makes it possible to prevent the silicon oxide contained in the negative electrode active material in the lithium ion secondary battery from disproportionation to Si and Li silicate.

DESCRIPTION OF EMBODIMENTS

Hereinafter, embodiments of the present invention will be described, but the present invention is not limited thereto.

As described above, a negative electrode mainly made of a silicon-based material has been investigated to be used as a negative electrode of a lithium ion secondary battery as a method to increase the battery capacity of lithium ion secondary battery. The lithium ion secondary battery using this silicon material is required to have cycle performance that is close to that of a lithium ion secondary battery using a carbon-based active material. However, it has not yet been proposed a negative electrode active material that gives cycle performance equal to that of lithium ion secondary battery using a carbon-based material.

Accordingly, the inventors have diligently investigated a negative electrode active material that gives favorable cycle performance when it is used as a negative electrode of a lithium ion secondary battery. As a result, the inventors have found that higher battery capacity and favorable cycle performance are obtained by using a negative electrode active material containing a negative electrode active material particle; the negative electrode active material particle containing a silicon compound shown by $SiO_x$ ($0.5 \leq x \leq 1.6$), wherein at least part of the $Si^{4+}$ contained in the negative electrode active material particle changes to at least one state selected from valence states of $Si^{y+}$ (y is any of 0, 1, 2, and 3) when the negative electrode active material occludes Li; thereby providing the present invention.

<Negative Electrode>

Figure 2:
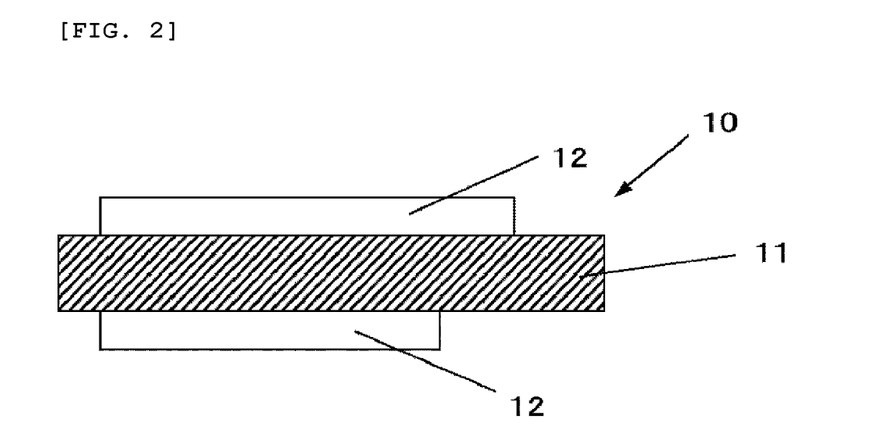
FIG. 2 is a sectional view showing an example of configuration of the inventive negative electrode.

First, the negative electrode (negative electrode for a non-aqueous electrolyte secondary battery) will be described. FIG. 2 is a sectional view showing an example of configuration of the inventive negative electrode.

[Configuration of Negative Electrode]

As shown in FIG. 2, the negative electrode 10 is constituted to have the negative electrode active material layer 12 on the negative electrode current collector 11. This negative electrode active material layer 12 may be disposed on the both sides or one side of the negative electrode current collector 11. When the inventive negative electrode active material is used, the negative electrode current collector 11 is not essential.

[Negative Electrode Current Collector]

The negative electrode current collector 11 is made of a highly electric conductive and mechanically strong material. Examples of the electric conductive material used for the negative electrode current collector 11 include copper (Cu) and nickel (Ni). This electric conductive material is preferably a material that does not form an intermetallic compound with lithium (Li).

The negative electrode current collector 11 preferably contains carbon (C) and sulfur (S) besides the main element because these elements improve the physical strength of the negative electrode current collector 11. In particular, when the negative electrode has an active material layer that expands in charging, the current collector containing the above elements can prevent deformation of an electrode including the current collector. Each content of the contained elements is not particularly limited, but is preferably 100 ppm by mass or less. Since this improves effect of preventing deformation. Such effect of preventing deformation further improves the cycle performance.

The surface of the negative electrode current collector 11 may or may not be roughed. Examples of the negative electrode current collector roughened include a metallic foil subjected to an electrolyzing process, an embossing process, or a chemical etching process. Examples of the negative electrode current collector that is not roughened include a rolled metallic foil.

[Negative Electrode Active Material Layer]

The negative electrode active material layer 12 contains the inventive negative electrode active material, which is capable of occluding and releasing lithium ions. In view of battery design, other materials may be further contained, such as a negative electrode binding agent (binder) or a conductive assistant agent.

The inventive negative electrode active material contains a negative electrode active material particle. The inventive negative electrode active material particle has a core portion that is capable of occluding and releasing a lithium ion. When the negative electrode active material particle has a surface layer portion containing a carbon material, the particle further has carbon covering portion to give electric conductivity.

The negative electrode active material particle contains a silicon compound ($SiO_x$: $0.5 \leq x \leq 1.6$), and the composition of the silicon compound is more preferable when "x" is closer to 1 since it brings stable battery properties. Incidentally, the composition of the silicon compound in the present invention does not necessarily mean the purity of 100%, and may contain a slight amount of impurity element. The silicon oxide contained in this negative electrode active material particle actually has a silicon oxide ($SiO_2$) component and a silicon (Si) component.

The inventive negative electrode active material is characterized in that at least part of the $Si^{4+}$ contained in the negative electrode active material particle changes to at least one state selected from valence states of $Si^{y-}$ (y is any of 0, 1, 2, and 3) when the negative electrode active material occludes Li. Incidentally, when the negative electrode active material occludes Li, the negative electrode active material particle contained in the negative electrode active material also occludes Li consequently. When the negative electrode active material releases Li, the negative electrode active material particle contained in the negative electrode active material also releases Li consequently.

When an ordinary silicon oxide materials are subjected to charging, there occurs silicide reaction, in which Si and Li react, as well as Li silicate reaction, in which $SiO_2$ and Li react, and Si is singly assigned capacity. That is, Si singly functions as an active material to occlude and release Li. Li silicates, such as $Li_4SiO_4$ formed by Li silicate reaction in which $SiO_2$ and Li react, have quadrivalent Si, which is a stable Li compound and is hard to release Li. Accordingly, this Li silicate fails to function as an active material and causes irreversible capacity. In the negative electrode active material particle in the present invention, at least part of the $Si^{4+}$ of the silicon dioxide ($SiO_2$) component changes the valence number less than 4 ($Si^{y+}$) in Li occlusion. For example, at least part of the silicon dioxide component is decomposed to an irreversible component(s) ($Si^{z+}$ (z is any of 1, 2, and 3)). Accordingly, when the negative electrode active material particle in the present invention is charged, there actually occurs silicide reaction, in which Si and Li react, as well as reaction between SiOw (0<w<2) and Li. That is, in the present invention, not only 0-valent Si, but also Si with an intermediate valence number (1-valent, 2-valent, and 3-valent Si) functions as an active material, and the charging and discharging cycles are continued while the Si—O bond has been contained in this Si with an intermediate valence number.

Accordingly, the present invention makes it possible to prevent silicon oxide ($SiO_x$) from disproportionation to Si and Li silicate due to charging and discharging to improve battery properties. It is also possible to prevent a reaction of Si alone to prevent enlargement of Si. As a result, favorable cycle performance is obtained.

The negative electrode active material particle in the present invention is preferably the one to form a state of $Si^{0+}$ when the negative electrode active material occludes and releases Li. It is considered that the $Si^{0+}$ is formed from a species having Si—O bond(s) ($Si^{1+}$, $Si^{2+}$, $Si^{3+}$, or $Si^{4+}$) by cutting at least part of the Si—O bond(s) due to repeating of charging and discharging, for example. Incidentally, $Si^{0+}$ mainly forms in discharging. This indicates that the Li silicate (which is Li silicate having $Si^{1+}$, $Si^{2+}$, or $Si^{3+}$, occluding Li in a state of incomplete silicon oxide that will be described later) releases O from Si to form an Si—Si bond when Li is extracted. The negative electrode active material like this makes it possible to further prevent the silicon oxide from disproportionation to Si and Li silicate (Li silicate having quadrivalent Si) due to charging and discharging, and to give stable battery properties.

In this case, the $Si^{0+}$ is preferably amorphous Si. The negative electrode active material containing Si with lower crystallinity like this makes it possible to further prevent the silicon oxide from disproportionation to Si and Li silicate due to charging and discharging. Incidentally, this amorphous Si cannot be determined by X-ray diffraction (XRD), and changes to a phase of long-range order structure.

The $Si^{z+}$ (z is any of 1, 2, and 3) in the $Si^{y+}$ can be in a form of a Li compound when the negative electrode active material has occluded Li. That is, Li can be occluded in a state of incomplete silicon oxide. The negative electrode active material like this can be in a form of a Li compound and function as an active material when the $Si^{z-}$ has occluded Li. Incidentally, "incomplete" herein means that the valence number of Si is more than 0 and less than 4. On the other hand, $SiO_2$, the coordination number of which is four, is complete silicon oxide, i.e., silicon dioxide.

The negative electrode active material preferably has at least one kind of shoulder peak in a range of an energy more than 1841 eV and 1845 eV or less in an X-ray Absorption Near-Edge Structure (XANES) spectrum obtained by XANES measurement performed such that a first secondary battery having a negative electrode containing the negative electrode active material and a positive electrode containing a positive electrode active material is subjected to 100 cycles of charging and discharging, followed by disassembling the first secondary battery subjected to the charging and discharging, and producing a second secondary battery having the negative electrode subjected to the charging and discharging together with a counter electrode composed of metallic Li to set the second secondary battery to have an open-circuit potential (OCP) of 2.0 V, and then the negative electrode is taken out from the second secondary battery and subjected to the XANES measurement. The peak position is more preferably in a range of 1842 eV or more and 1844 eV or less, particularly preferably near 1843 eV (within ±0.5 eV). The shoulder peak in a range of more than 1841 eV and 1845 eV or less is originated from $Si^{z+}$. Accordingly, the negative electrode active material like this contains larger amount of $Si^{z+}$, making the $Si^{z+}$ easier to function as an active material. This makes it possible to further prevent the silicon oxide from disproportionation to Si and Li silicate due to charging and discharging. Illustrative examples of the first secondary battery include a laminate film type lithium ion secondary battery 30 shown in FIG. 3 described later. Illustrative examples of the second secondary battery include a 2032 type coin battery shown in Example described later.

In the present invention, the change of valence number of $Si^{4+}$ in Li occlusion can be determined from the shape of XANES spectrum. In a XANES spectrum, the existence of a peak such as a shoulder peak at a specific position means existence of large amount of Si in a state of the valence number. For example, a shoulder peak near 1839 eV in a XANES spectrum means existence of large amount of $Si^{0+}$ (amorphous Si) state. A shoulder peak near 1841 eV means existence of large amount of $Si^{0+}$ (crystalline Si, also referred to as Si with a long-range order structure) state. A shoulder peak near 1843 eV means existence of large amount of $Si^{2+}$ state. A shoulder peak at an energy slightly lower than 1843 eV (e.g., near 1842 eV) means existence of large amount of $Si^{1+}$ state. A shoulder peak at an energy slightly higher than 1843 eV (e.g., near 1844 eV) means existence of large amount of $Si^{3+}$ state. Accordingly, when a shoulder peak exists at these positions, it is determined that the valence number of $Si^{4+}$ has changed in Li occlusion. Incidentally, it is impossible to distinguish an Si component originally contained in an active material and $Si^{0+}$ formed from $Si^{4-}$ by changing the valence number. It is possible, however, to find whether $Si^{0+}$ has increased or not by comparing the height to the height of other peaks (e.g., the height of a peak originated from $Si^{4+}$ contained in $Li_4SiO_4$) in a XANES spectrum. The increases of $Si^{0+}$, $Si^{1+}$, $Si^{2+}$, and $Si^{3+}$ may be determined by comparing XANES spectra before and after Li occlusion. Incidentally, a peak near 1847 eV means existence of large amount of $Si^{4+}$ state contained in $Li_4SiO_4$.

The above shoulder peak sometimes undetectable even when the valence number of $Si^{4+}$ has changed in Li occlusion. This is such a case that peaks originated from $Si^{0+}$, $Si^{1+}$, $Si^{2+}$, and $Si^{3+}$ are large as a whole (a featureless sloping peak exists overall) or small as a whole. In these cases, it is possible to determine increases of $Si^{0+}$, $Si^{1+}$, $Si^{2+}$, and $Si^{3+}$ by comparing XANES spectra before and after Li occlusion or else.

The negative electrode active material particle is preferably the one in which $Si^{z+}$ (z is any of 1, 2, and 3) in the $Si^{y+}$ and the $Si^{4+}$ are reversibly changed to each other when the negative electrode active material repeats occlusion and release of Li. That is, the $Si^{z+}$ preferably functions as an active material to occlude and release Li and changes the valence number of Si to +4 in this occlusion and release. Such reversible changing of $Si^{z+}$ makes it possible to further prevent reaction of Si alone to further prevent Si from enlarging. In this case, the $Si^{z+}$ is also preferable to be in a form of a Li compound as in the above case when the negative electrode active material occludes Li. In some cases, the $Si^{z+}$ occludes and releases Li without changing the valence number. Incidentally, $Si^{0+}$ is not oxidized and does not change the valence number thereby.

The median diameter ($D_{50}$: the particle size at the cumulative volume of 50%) of the negative electrode active material particle is not particularly limited, but is preferably 0.5 μm or more and 20 μm or less. When the median diameter is in the above range, it becomes easy to occlude and release a lithium ion in charging and discharging, and the particle is prevented from breakage. When the median diameter is 0.5 μm or more, it is possible to decrease the surface area per mass to prevent increase of battery irreversible capacity. On the other hand, when the median diameter is 20 μm or less, the particle is prevented from breakage, and is prevented from forming a new surface thereby.

The negative electrode active material particle preferably has a surface layer portion containing a carbon material.

The negative electrode active material particle, containing a carbon material in the surface layer portion like this, is improved in electric conductivity. Accordingly, using a negative electrode active material containing the negative electrode active material particle like this as a negative electrode active material of a lithium ion secondary battery, the battery properties are successfully improved.

The average thickness of the carbon material is preferably 5 nm or more and 5000 nm or less.

When the average thickness of the carbon material for covering is 5 nm or more, the electric conductivity is improved. When the average thickness of the carbon material for covering is 5000 nm or less, it is possible to prevent lowering of the battery capacity in case of using a negative electrode active material containing the negative electrode active material particle like this as a negative electrode active material of a lithium ion secondary battery.

The average thickness of this carbon material can be calculated by the following procedure, for example. First, the negative electrode active material is observed through transmission electron microscope (TEM) at an optional magnification. This magnification is preferably a magnification by which the thickness of carbon material can be determined visually so as to measure the thickness. Subsequently, the thicknesses of carbon material are measured at 15 random points. In this case, it is preferable to set the measuring points widely and randomly as possible without focusing a particular place. Lastly, the average value of the thicknesses of carbon material at the 15 points are calculated.

The covering rate of carbon material is not particularly limited, but is desirable to be as high as possible. The covering rate of 30% or more improves the electric conductivity further, and is preferable. The method for covering the carbon material is not particularly limited, but a method of carbonizing saccharide and a pyrolysis method of hydrocarbon gas are preferable since they can improve the covering rate.

As the negative electrode binder contained in the negative electrode active material layer 12, any one or more of polymer material, synthetic rubber, and so on are usable, for example. Illustrative examples of the polymer material includes polyvinylidene fluoride, polyimide, polyamideimide, aramid, polyacrylic acid, lithium polyacrylate, and carboxymethyl cellulose. Illustrative examples of the synthetic rubber includes styrene-butadiene rubber, fluororubber, and ethylene-propylene-diene.

As the negative electrode conductive assistant agent, any one or more of a carbon material, such as carbon black, acetylene black, graphite, ketjen black, carbon nanotube, and carbon nanofiber can be used.

The negative electrode active material layer 12 may contain a carbon-based active material in addition to the inventive negative electrode active material (silicon-based active material). This makes it possible to lower electric resistance of the negative electrode active material layer 12 and to ease expansion stress due to charging. Illustrative examples of this carbon-based active material includes pyrolytic carbons, cokes, glassy carbon fiber, baked organic polymer compound, and carbon black.

The negative electrode active material layer 12 is formed by an application method, for example. The application method is a method in which a silicon-based active material is mixed with the above binder and so on, optionally with a conductive assistant agent or a carbon-based active material, and then dispersed to organic solvent, water, or the like so as to be applied.

[Method of Producing Negative Electrode]

The negative electrode 10 can be produced by the following procedures, for example. First, a method of producing a negative electrode active material used for a negative electrode will be described. In the beginning, negative electrode active material particles each containing a silicon compound shown by a general formula $SiO_x$ ($0.5 \leq x \leq 1.6$) are prepared. Then, a negative electrode active material particle is selected in which at least part of the $Si^{4+}$ contained in the negative electrode active material particle changes to at least one state selected from valence states of $Si^{y+}$ (y is any of 0, 1, 2, and 3) when the negative electrode active material occludes Li.

The negative electrode active material particle containing a silicon compound ($SiO_x$: $0.5 \leq x \leq 1.6$) can be prepared by the following procedure, for example. First, a raw material which generates silicon oxide gas is heated at a temperature range of 900° C. to 1600° C. in a reduced pressure under an inert gas atmosphere to generate silicon oxide gas. In this case, the raw material can be a mixture of metallic silicon powder and silicon dioxide powder. When considering the existence of oxygen on surface of the metallic silicon powder and slight oxygen in a reaction furnace, the mixing molar ratio is desirably in a range of 0.8<metallic silicon powder/silicon dioxide powder<1.3.

Then, the generated silicon oxide gas is solidified and deposited on an absorbing plate (deposition plate). In this case, a carbon material can be disposed on the way along the stream of the gas, or Si vapor may be partly mixed to the gas. This makes it easy to obtain a negative electrode active material particle in which the $Si^{4+}$ changes to $Si^{y+}$ in Li occlusion, particularly a negative electrode active material particle in which the $Si^{4+}$ and $Si^{z+}$ (z is any of 1, 2, and 3) in the $Si^{y+}$ are reversibly changed to each other when occlusion and release of Li are repeated. Subsequently, the deposit of silicon oxide is taken out under the condition of the temperature in the reaction furnace of 100° C. or below, and then the deposit is ground and powdered using a ball mil, a jet mil, or the like. As described above, the negative electrode active material particle is successfully produced.

Incidentally, the manufacturing method is not limited to the above method to mix a carbon material or Si vapor as a method of obtaining the negative electrode active material particle in which the $Si^{4+}$ changes to $Si^{y+}$ in Li occlusion, particularly the $Si^{4+}$ and $Si^{z+}$ in the $Si^{y-}$ are reversibly changed to each other when occlusion and release of Li are repeated. For example, these negative electrode active material particles can be obtained more easily by changing the vaporization temperature of raw material to generate silicon oxide gas, changing the temperature of deposition plate, changing the injection amount or the kind of gas (an inert gas, a reduction gas) relative to deposition stream of the silicon oxide gas, changing the pressure in a furnace containing silicon oxide gas, or changing the temperature or time of heat treatment after forming a negative electrode active material particle or deposition of a carbon material described later.

Then, a carbon material is formed on the surface layer portion of the prepared negative electrode active material particle. This step, however, is not essential. As a method for forming the carbon material layer, a thermal decomposition CVD method is desirable. The following describes an example of a method of forming a carbon material layer by thermal decomposition CVD method.

First, the negative electrode active material particle is set into a furnace. Then, hydrocarbon gas is introduced into the furnace, and the temperature in the furnace is increased. The decomposition temperature is not particularly limited, but is desirably 1200° C. or less. The temperature in the furnace is raised to a prescribed temperature, followed by forming carbon material on the surface layer portion of the negative electrode active material particle. The hydrocarbon gas to be a raw material of the carbon material is not particularly limited, but is desirable to have a $C_nH_m$ composition in which n≤3. When n≤3, it is possible to reduce the production cost and to improve the properties of the decomposition products.

As described above, covering of the negative electrode active material particle with a carbon material allows the compound in the bulk to be in a more uniform state, and to improve the stability as an active material to give higher effect.

In the negative electrode active material produced by these production method, the silicon dioxide component in the bulk of the silicon oxide is allowed to partly change to a reversible component in reaction with Li, and the state of silicon-lithium bond is derived to a state suitable for a secondary battery.

The negative electrode active material produced (selected) as described above is mixed with other materials such as a negative electrode binder and a conductive assistant agent to form a negative electrode mixture, followed by adding organic solvent or water to form slurry. Then, the negative electrode mixture slurry is applied to the surface of the negative electrode current collector 11 and is dried to form the negative electrode active material layer 12. In this case, heating press may be performed in accordance with needs. As described above, a negative electrode is successfully produced.

The selection can be performed by producing negative electrode active material particles, followed by taking out the part of them to be subjected to the XANES measurement, and adopting a negative electrode active material particle that satisfies conditions of the present invention. This selection is not necessarily performed in each production of the negative electrode active material particle. When a negative electrode active material particle produced in a specific conditions satisfies the conditions of the present invention, the negative electrode active material particle produced under the same conditions can be determined to have the same properties, and this can be selected to be the negative electrode active material particle.

<Lithium Ion Secondary Battery>

Then, the inventive lithium ion secondary battery will be described. The inventive lithium ion secondary battery uses the inventive negative electrode described above as a negative electrode. Here exemplifies a lithium ion secondary battery of a laminate film type as a concrete example.

[Configuration of Laminate Film Secondary Battery]

Figure 3:
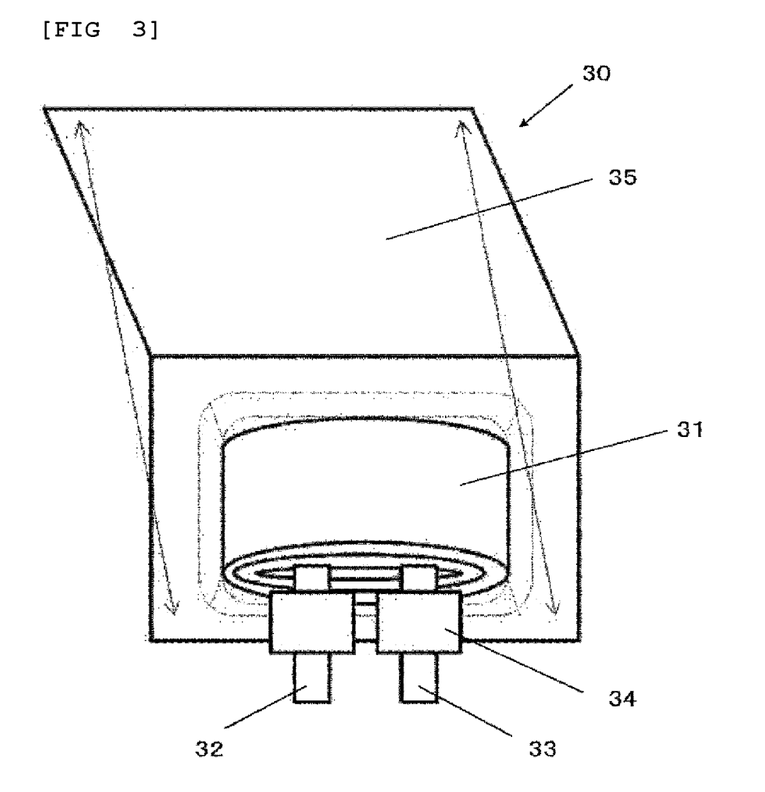
FIG. 3 is an exploded diagram showing an example of configuration of the inventive lithium ion secondary battery (a laminate film type)

The laminate film type lithium ion secondary battery 30 shown in FIG. 3 mainly includes a wound electrode body 31 stored in sheet-shaped outer parts 35. This wound body is formed by winding a positive electrode, a negative electrode, and a separator disposed between these electrodes. There is also a case storing a laminate having a separator disposed between a positive electrode and a negative electrode. The electrode bodies of both types have a positive-electrode lead 32 attached to the positive electrode and a negative-electrode lead 33 attached to the negative electrode. The outermost circumference of the electrode bodies is protected by a protecting tape.

The positive-electrode lead and the negative-electrode lead, for example, extends from the interior of the outer parts 35 toward the exterior in one direction. The positive-electrode lead 32 is made of, for example, a conductive material such as aluminum; the negative-electrode lead 33 is made of, for example, a conductive material such as nickel or copper.

An example of the outer part 35 is a laminate film composed of a fusion-bond layer, a metallic layer, and a surface protecting layer stacked in this order. Two laminate films are fusion-bonded or stuck with an adhesive at the outer edge of their fusion-bond layers such that each fusion-bond layer faces the wound electrode body 31. The fusion-bond layer may be, for example, a film such as a polyethylene or polypropylene film; the metallic layer may be aluminum foil, for example; the protecting layer may be nylon, for example.

The space between the outer parts 35 and the positive and negative electrode leads is filled with close adhesion films 34 to prevent air from entering therein. Exemplary materials of the close adhesion films include polyethylene, polypropylene, and polyolefin resins.

[Positive Electrode]

The positive electrode has a positive electrode active material layer disposed on one side or both sides of a positive electrode current collector as in the negative electrode 10 shown in FIG. 2, for example.

The positive electrode current collector is made of, for example, a conductive material such as aluminum.

The positive electrode active material layer contains any one kind or two kinds of positive electrode materials capable of occluding and releasing lithium ions, and may contain a binder, a conductive assistant agent, a dispersing agent, or other materials according to design. The same detailed description as described for the negative electrode binders and negative electrode conductive assistant agent, for example, is then given for the binder and the conductive assistant agent.

The positive electrode material is preferably a compound containing lithium. Examples of the lithium-containing compound include a complex oxide composed of lithium and a transition metal element, and a phosphate compound containing lithium and a transition metal element. Among them, a compound containing at least one of nickel, iron, manganese, and cobalt is preferable for the positive electrode material. The chemical formula of this positive electrode material is expressed by, for example, $Li_xM1O_2$ or $Li_yM2PO_4$, where M1 and M2 represent at least one kind of transition metal elements, and "x" and "y" represent a value varied depending on a charging or discharging status of a battery, which typically satisfy 0.05≤x≤1.10 and 0.05≤y≤1.10.

Examples of the complex oxide composed of lithium and a transition metal element include a lithium cobalt complex oxide ($Li_xCoO_2$) and a lithium nickel complex oxide ($Li_xNiO_2$). Examples of the phosphate compound containing lithium and a transition metal element include a lithium iron phosphate compound ($LiFePO_4$), a lithium iron manganese phosphate compound ($LiFe_{1-u}Mn_uPO_4$ (0<u<1)). This is because higher battery capacity and excellent cycle performance are obtained using the positive electrode materials described above.

[Negative Electrode]

The negative electrode has a configuration similar to that of the above negative electrode 10 in FIG. 2, and, for example, has the negative electrode active material layers disposed on both faces of the current collector. The negative electrode preferably has a negative-electrode charge capacity larger than electrical capacitance (a battery charge capacity) provided by the positive electrode active material. This makes it possible to prevent precipitation of lithium metal on the negative electrode.

The positive electrode active material layer is formed partially on both faces of the positive electrode current collector. The negative electrode active material layer is also formed partially on both faces of the negative electrode current collector. Such a negative electrode may have, for example, an area at which the positive electrode active material layer is not present on the surface of the positive electrode current collector that the negative electrode active material layer faces. This area permits stable battery design.

The above area at which the positive and negative electrode active material layers do not face one another is hardly affected by charging and discharging. The status of the negative electrode active material layer is consequently retained since its formation. This enables repeatable investigation of the composition of negative electrode active material with high precision without being affected by charging and discharging.

[Separator]

The separator separates the positive electrode and the negative electrode, prevents short circuit current due to contact of these electrodes, and passes lithium ions therethrough. This separator may be made of, for example, a porous film of synthetic resin or ceramics, or two or more stacked porous films. Examples of the synthetic resin include polytetrafluoroethylene, polypropylene, and polyethylene.

[Electrolytic Solution]

At least a part of the active material layers or the separator is impregnated with a liquid electrolyte (an electrolytic solution). This electrolytic solution is composed of electrolyte salt dissolved in a solvent and may contain other materials such as additives.

The solvent may be, for example, a non-aqueous solvent. Examples of the non-aqueous solvent include ethylene carbonate, propylene carbonate, butylene carbonate, dimethyl carbonate, diethyl carbonate, ethylmethyl carbonate, methylpropyl carbonate, 1,2-dimethoxyethane, and tetrahydrofuran. Among these, ethylene carbonate, propylene carbonate, dimethyl carbonate, diethyl carbonate, or ethylmethyl carbonate, or the combination thereof is preferable. Such solvent enables better performances. In this case, the dissociation of electrolyte salt and ionic mobility can be improved by combined use of a viscous solvent, such as ethylene carbonate or propylene carbonate, and a non-viscous solvent, such as dimethyl carbonate, ethylmethyl carbonate, or diethyl carbonate.

For an alloyed negative electrode, the solvent preferably contains at least one of halogenated chain carbonate ester and halogenated cyclic carbonate ester. Such a solvent enables the negative electrode active material to be coated with a stable coating at discharging and particularly charging. The halogenated chain carbonate ester is chain carbonate ester having halogen as a constitutive element (at least one hydrogen is substituted by halogen). And the halogenated cyclic carbonate ester is cyclic carbonate ester having halogen as a constitutive element (that is, at least one hydrogen is substituted by halogen).

The halogen is preferably, but not limited to, fluorine, for fluorine enables the formation of better coating than other halogens do. A larger number of halogens is better, for a more stable coating can be obtained which reduces a decomposition reaction of an electrolytic solution.

Examples of the halogenated chain carbonate ester include fluoromethyl methyl carbonate, difluoromethyl methyl carbonate. Examples of the halogenated cyclic carbonate ester include 4-fluoro-1,3-dioxolane-2-one, 4,5-difluoro-1,3-dioxolane-2-one.

The solvent preferably contains an unsaturated carbon bond cyclic carbonate as an additive, for this enables the formation of a stable coating on a negative electrode at charging and discharging and the inhibition of a decomposition reaction of the electrolyte. Examples of the unsaturated carbon bond cyclic carbonate include vinylene carbonate and vinyl ethylene carbonate.

In addition, the solvent preferably contains sultone (cyclic sulfonic acid ester) as an additive, for this enables improvement in chemical stability of a battery. Examples of the sultone include propane sultone and propene sultone.

In addition, the solvent preferably contains acid anhydride, for this enables improvement in chemical stability of the electrolytic solution. The acid anhydride may be, for example, propane disulfonic acid anhydride.

The electrolyte salt may contain, for example, at least one light metal salt such as lithium salt. Examples of the lithium salt include lithium hexafluorophosphate ($LiPF_6$), and lithium tetrafluoroborate ($LiBF_4$).

The content of the electrolyte salt in the solvent preferably ranges from 0.5 mol/kg or more and 2.5 mol/kg or less. Since this content enables high ionic conductivity.

[Method of Producing Laminate Film Type Lithium Ion Secondary Battery]

Firstly, a positive electrode is produced with the above positive electrode material. A positive electrode mixture is created by mixing the positive electrode active material with as necessary the binder, the conductive assistant agent, and other materials, and dispersed in an organic solvent to form slurry of the positive-electrode mixture. The mixture slurry is then applied to a positive electrode current collector with a coating apparatus such as a die coater having a die head or a knife roll, and dried by hot air to obtain a positive electrode active material layer. The positive electrode active material layer is finally compressed with, for example, a roll press. In this case, heating may be performed, and the heating or the compression may be repeated multiple times.

Secondly, a negative electrode active material layer is formed on a negative electrode current collector to produce a negative electrode through the same procedure as in the above production of the negative electrode 10.

In producing the positive electrode and the negative electrode, the active material layers are formed on both faces of the positive and negative electrode current collector. In both the electrodes, the length of these active material layers formed on the faces may differ from one another (See FIG. 2).

Then, an electrolytic solution is prepared. With ultrasonic welding and so on, the positive electrode lead 32 is attached to the positive electrode current collector and the negative-electrode lead 33 is attached to the negative electrode current collector. The positive and negative electrodes and the separator interposed therebetween are stacked or wound to produce the wound electrode body 31 and a protecting tape is stuck to the outermost circumference of the body. The electrode body is flattened. The film-shaped outer part is folded in half to interpose the electrode body therebetween. The insulating portions of the outer part 35 are stuck to one another by heat sealing such that one of the four sides is free to house the wound electrode body. The close adhesion films are inserted between the outer part and the positive and negative electrode leads. The prepared electrolytic solution is introduced from the free side in a prescribed amount to perform the impregnation of the electrolytic solution under a vacuum. The free side is stuck by vacuum heat sealing. In this manner, the laminate film lithium ion secondary battery 30 is successfully produced.

In the present invention, thus obtained lithium ion secondary battery is preferably used as follows. That is, it is preferred to set a final voltage of the inventive lithium ion secondary battery so as to use the inventive negative electrode in a range of potential lower than the value at an inflection point formed near 0.7 V of a discharge curve (hereinafter, also referred to as a lower potential design) obtained from a secondary battery having the inventive negative electrode and a counter electrode composed of metallic Li (counter electrode Li). The usage like this makes it possible to further prevent silicon oxide from disproportionation to Si and Li silicate due to charging and discharging in a negative electrode active material contained in a negative electrode of a lithium ion secondary battery. Hereinafter, the inventive method of using the lithium ion secondary battery will be described by reference to FIG. 4.

Figure 4:
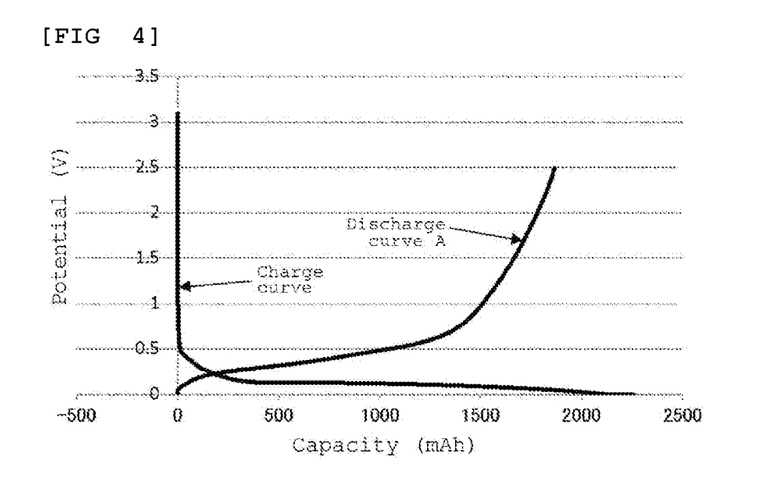
FIG. 4 shows a discharge curve and a charge curve obtained from a secondary battery having a negative electrode containing silicon oxide ($SiO_x$) and a counter electrode composed of metallic Li.

FIG. 4 is a discharge curve (hereinafter, also referred to as Discharge curve A) and a charge curve obtained from a secondary battery having a negative electrode containing silicon oxide ($SiO_x$) and a counter electrode composed of metallic Li. The ordinate represents potential (V), and the abscissa represents capacity (mAh). The curve in which the potential is about 3 V at 0 mAh is a charge curve, and the curve in which the potential is about 0 V at 0 mAh is a discharge curve (Discharge curve). The capacity means a charged capacity in the charge curve, and means a discharged capacity in the discharge curve. As shown in FIG. 4, the discharge curve has an inflection point at 0.7 V. The "inflection point" herein means a point at which an increment ratio of the potential relative to the capacity rapidly increases. In this case, the negative electrode discharging potential can be provided as lower potential when it is less than 0.7 V (e.g., 0.66 V or less), and as higher potential when it is 0.7 V or more. Accordingly, in the case shown in FIG. 4, it is preferred to set the final voltage of the inventive lithium ion secondary battery so as to use the inventive negative electrode at the negative electrode discharging potential in a range of 0.66 V or less in this Discharge curve A. The discharge curve of the lithium ion secondary battery (hereinafter, also referred to as Discharge curve C) is a difference in which the Discharge curve A is subtracted from a discharge curve of the positive electrode relative to the Li counter electrode (hereinafter, also referred to as Discharge curve B) (i.e., synthesized curve). Having these Discharge curves A, B, and C previously, it is possible to determine the voltage of the Discharge curve C in volt when the negative electrode discharging potential of the Discharge curve A becomes 0.66 V. For example, if the voltage of the Discharge curve C becomes 3.0 V when the negative electrode discharging potential of the Discharge curve A becomes 0.66 V, the final voltage of the inventive lithium ion secondary battery is set to 3.0 V.

EXAMPLE

Hereinafter, the present invention will be more specifically described by showing Examples and Comparative Examples, but the present invention is not limited to the following Examples.

Example 1-1

The laminate film type lithium ion secondary battery 30 shown in FIG. 3 was produced by the following procedure.

The procedure began with the production of a positive electrode. A positive-electrode mixture was prepared by mixing 95 mass % of $LiNi_{0.7}Co_{0.25}Al_{0.05}O$ of lithium-nickel-cobalt complex oxide (lithium-nickel-cobalt-aluminum complex oxide: NCA) as a positive electrode active material, 2.5 mass % of a positive electrode conductive assistant agent, and 2.5 mass % of a positive electrode binder (polyvinylidene fluoride: PVDF). The positive-electrode mixture was dispersed in an organic solvent (N-methyl-2-pyrrolidone, NMP) to form paste slurry. The slurry was applied to both surfaces of a positive electrode current collector with a coating apparatus having a die head and dried with a drying apparatus of hot-air type. The positive electrode current collector used herein had a thickness of 15 μm. The resultant was finally compressed with a roll press.

Next, a negative electrode was produced. As a negative electrode active material, a mixed raw material of metallic silicon and silicon dioxide was introduced into a reaction furnace and evaporated under a vacuum atmosphere of 10 Pa to deposit the evaporated material on an absorbing plate. The deposit was taken out after it was sufficiently cooled, followed by pulverizing with a ball mill. After the particle diameter was adjusted, thermal decomposition CVD was performed to form a carbon material on the surface layer portion of the negative electrode active material particle. Subsequently, the negative electrode active material particle, a precursor of a negative electrode binder (polyamic acid), Conductive assistant agent 1 (flake-like graphite), and Conductive assistant agent 2 (acetylene black) were mixed in a dried-mass ratio of 80:8:10:2, and then diluted with NMP to form pasty negative electrode mixture slurry. In this case, NMP was used as solvent for polyamic acid. Then, the negative electrode mixture slurry was applied onto the both sides of a negative electrode current collector with a coating apparatus, followed by drying. As this negative electrode current collector, roughened electrolytic copper foil (thickness=15 μm) was used. Finally, this was baked at 700° C. for 1 hour in a vacuum atmosphere. This carbonized a part of the negative electrode binder. This also formed negative electrode active material layers on the both sides of the negative electrode collector. In this case, the negative electrode current collector contained carbon and sulfur, and each content was 100 ppm by mass or less.

Subsequently, solvents (4-fluoro-1,3-dioxolane-2-one (FEC), ethylene carbonate (EC), and dimethyl carbonate (DMC)) were mixed, followed by dissolving electrolyte salt (lithium hexafluorophosphate ($LiPF_6$)) to prepare an electrolytic solution. In this case, the solvent composition was set to FEC:EC:DMC=10:20:70 in a volume ratio, and the content of the electrolyte salt was set to 1.0 mol/kg based on the solvent.

Then, a secondary battery was assembled as follows. First, an aluminum lead was attached to one end of the positive electrode current collector with ultrasonic welding, and a nickel lead was welded to one end of the negative electrode current collector. Subsequently, the positive electrode, a separator, the negative electrode, and a separator were laminated in this order, and wound in the longitudinal direction to produce a wound electrode body. The end of the winding was fixed with a PET protecting tape. The separator used herein was a laminate film (thickness: 12 μm) in which a film mainly composed of porous polyethylene was sandwiched by films mainly composed of porous polypropylene. Subsequently, the electrode body was interposed between outer parts and the outer circumferences except one side were heat-sealed to house the electrode body therein. The outer part was an aluminum laminate film in which a nylon film, an aluminum foil, and a polypropylene film were laminated. Then, the electrolytic solution was introduced from the open side to perform the impregnation under a vacuum. The open side was then stuck by heat sealing.

On the secondary battery thus produced, the cycle performance were evaluated.

The cycle performance were investigated as follows. First, two cycles of charging and discharging were performed under an atmosphere of 25° C. to stabilize the battery and the discharge capacity in the second cycle was measured. Next, the cycle of charging and discharging was repeated until the total number of cycles reached 100 cycles and the discharge capacity was measured every cycle. Finally, a capacity retention rate was calculated by dividing the discharge capacity in the 100-th cycle by the discharge capacity in the second cycle. Incidentally, as the cycle condition, charging was performed at a constant current density of 2.5 mA/cm$^2$ until the voltage reached 4.2 V, and after the voltage reached 4.2 V, charging was performed at a constant voltage of 4.2 V until the current density reached 0.25 mA/cm$^2$. The discharging was performed at a constant current density of 2.5 mA/cm$^2$ until the voltage reached 2.5 V.

Subsequently, a 2032 type coin battery was assembled as a secondary battery for XAFS measuring test.

The negative electrode was subjected to the following treatment for use. First, a secondary battery was produced in the same way as in the laminate film type lithium ion secondary battery 30 in the evaluation of cycle performance described above, and was subjected to 100 cycles of charging and discharging in the same conditions as in the evaluation of cycle performance. Then, the secondary battery was disassembled after the charging and discharging, and the negative electrode subjected to the charging and discharging was taken out from this secondary battery. Thus obtained negative electrode was used as a negative electrode of a 2032 type coin battery. Incidentally, this negative electrode had a deposited amount of negative electrode active material layer per unit area at one side (also referred to as an area density) of 2.5 mg/cm$^2$.

The electrolytic solution used was produced in the same way as in the electrolytic solution of the laminate film type lithium ion secondary battery 30 in the evaluation of cycle performance described above.

The counter electrode used was a metallic lithium foil with a thickness of 0.5 mm. The separator had a thickness of 20 μm using polyethylene.

Then, a bottom cover of the 2032 type coin battery, the lithium foil, and the separator were piled up, and 150 mL of the electrolytic solution was poured thereinto. Subsequently, the negative electrode and a spacer (thickness: 1.0 mm) were piled up thereon, and 150 mL of the electrolytic solution was poured thereinto. Then, a spring and a top cover of the coin battery were assembled in this order, followed by caulking with an automatic caulking apparatus for a coin cell, whereby a 2032 type coin battery was produced.

Subsequently, this 2032 type coin battery was set to have an open-circuit potential of 2.0 V. Then, the negative electrode was taken out from the coin battery and subjected to XANES measurement.

The conditions for measuring X-ray Absorption Fine Structure (XAFS) were as follows.
Institution for measuring: Aichi Synchrotron Radiation Center
  acceleration energy: 1.2 GeV,
  accumulated current value: 300 mA,
  condition for monochromaticity: white X-ray from a bending magnet was monochromatized with a double crystal monochromator to be used for measurement
Condensation condition: condensation in vertical and horizontal directions with a bend cylindrical mirror coated with Ni
Opening of upper slit: 7.0 mm in horizontal direction×3.0 mm in vertical
Beam size: 2.0 mm in horizontal direction×1.0 mm in vertical
Incident angle to sample: normal incidence (incident angle of 0°)
Energy calibration: calibrated with the peak position at S—K edge of K$_2$SO$_4$ as 2481.70 eV
Measuring method: total electron yield method by measuring sample current
Method for measuring I$_0$:
  in measuring X-ray Absorption Near Edge Structure (XANES): Au-mesh
  in measuring Extended X-ray Absorption Fine Structure (EXAFS): Al-mesh
Circumstances of sample: transferred using a transfer vessel without exposing to the atmosphere
  degree of vacuum: 5×10$^{-7}$ Pa Examples 1-2 and 1-3, Comparative Example 1-1

Secondary batteries were produced and evaluated for the cycle performance by the same way as in Example 1-1 except for changing existence or nonexistence of change of Si$^{y+}$, existence or nonexistence of Si$^{0+}$, existence or nonexistence of Si$^{0+}$ amorphous, and existence or nonexistence of a shoulder peak in a range of more than 1841 eV and 1845 eV or less. In this case, conditions for producing silicon oxide were changed (changing the temperature of a deposition plate, changing the pressure in a furnace involving silicon oxide gas, disposing a carbon material in the middle of silicon oxide gas stream, or partly mixing Si vapor with this gas) to control existence or nonexistence of change of Si$^{y+}$. Table 1 shows the results of Examples 1-1 to 1-3 and Comparative Example 1-1. Incidentally, each Si$^{0+}$ in Tables 1 to 6 refers Si$^{0+}$ formed from a species having Si—O bond(s) (Si$^{1+}$, Si$^{2+}$, Si$^{3+}$, or Si$^{4+}$) by cutting at least part of the Si-0 bond(s). Accordingly, in Comparative Example 1-1 and so on, where there is no change of Si$^{y+}$ originally, these columns are described as "–".

Incidentally, the negative electrode active material had the following characteristics in Examples 1-1 to 1-3 and Comparative Example 1-1: "x" in SiO$_x$ was 1; the median diameter of the negative electrode active material particle was 5 μm; the negative electrode active material particle had a surface layer portion containing a carbon material with the average thickness of 100 nm. In these Examples and Comparative Example, a lower potential design was not employed.

TABLE 1

SiOx x = 1, D$_{50}$ = 5 μm, copper foil: carbon and sulfur existed, positive electrode: NCA, carbon covering layer existed 100 nm, lower potential design was not employed

|  | Change of Si$^{y+}$ | Si$^{0+}$ | Si$^{0+}$ amorphous | Shoulder peak in range of more than 1841 eV and 1845 eV or less | Capacity retention rate at 100$^{th}$ cycle |
|---|---|---|---|---|---|
| Comparative Example 1-1 | None | — | — | None | 70 |
| Example 1-1 | Exist | Exist | None | None | 78 |

TABLE 1-continued

SiOx x = 1, $D_{50}$ = 5 μm, copper foil: carbon and sulfur existed, positive electrode: NCA, carbon covering layer existed 100 nm, lower potential design was not employed

|  | Change of $Si^{y+}$ | $Si^{0+}$ | $Si^{0+}$ amorphous | Shoulder peak in range of more than 1841 eV and 1845 eV or less | Capacity retention rate at $100^{th}$ cycle |
|---|---|---|---|---|---|
| Example 1-2 | Exist | Exist | Exist | Exist | 83 |
| Example 1-3 | Exist | Exist | None | Exist | 80 |

As shown in Table 1, with change of $Si^{y+}$, Examples 1-1 to 1-3 exhibited favorable battery retention rate compared to Comparative Example 1-1, in which $Si^{y+}$ unchanged. In particular, having all of the $Si^{0+}$, $Si^{0+}$ amorphous, and shoulder peak, Example 1-2 exhibited most favorable battery retention rate.

Figure 1:
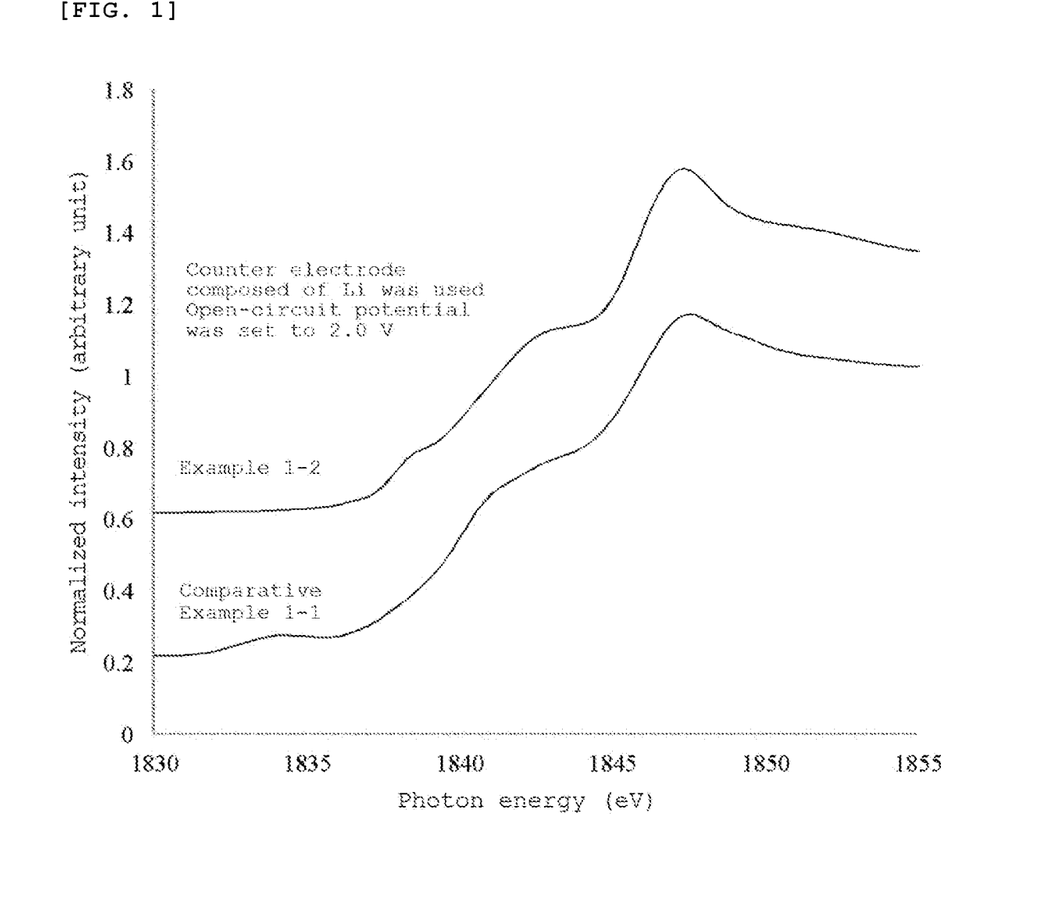
FIG. 1 shows XANES spectra measured in Example 1-2 and Comparative Example 1-1.

Hereinafter, Example 1-2 and Comparative Example 1-1 are more specifically described by reference to FIG. 1. FIG. 1 shows XANES spectra measured in Example 1-2 and Comparative Example 1-1. The ordinate represents normalized intensity (in arbitrary unit) and the abscissas represents photon energy (eV). As shown in FIG. 1, ordinal silicon oxide (Comparative Example 1-1) disproportionate to Li silicate and Si as charging and discharging are repeated. In this case, XAFS measurement gives a shoulder peak near 1841 eV originated from Si and a peak near 1847 eV originated from Li silicate ($Li_4SiO_4$) separated in a XANES region.

On the other hand, as shown in FIG. 1, Example 1-2 exhibited a shoulder peak near 1839 eV originated from amorphous Si and a shoulder peak near 1843 eV originated from $Si^{2+}$, together with a peak originated from Li silicate ($Li_4SiO_4$). That is, Example 1-2 brought a situation in which zero-valent and quadrivalent intermediates ($Si^{z+}$ (z being any of 1, 2, and 3), particularly $Si^{2+}$) participated in reaction of occluding and releasing Li. The use of amorphous Si and $Si^{z+}$ like this largely improved the battery properties. Incidentally, the shoulder peak in a range of more than 1841 eV and 1845 eV or less is probably originated from $Si^{z+}$. In Example 1-1, the shoulder peak was not determined. This is probably due to an increased shoulder peak near 1841 eV originated from $Si^{0+}$ compared to that in Example 1-2. That is, it is considered that the shoulder peak could not be determined in Example 1-1 since the peaks originated from $Si^{0+c}$, $Si^{1+}$, $Si^{2+}$, and $Si^{3+}$ were small as a whole.

Examples 2-1 and 2-2, Comparative Examples 2-1 and 2-2

Secondary batteries were produced and evaluated for the cycle performance under the same conditions as in Example 1-2 except for controlling the oxygen amount in the bulk of the silicon compound. The results are shown in Table 2. In this case, the oxygen amount was controlled by changing the ratio of metallic silicon and silicon oxide in the raw material of the silicon compound or the heating temperature.

TABLE 2

$D_{50}$ = 5 μm, copper foil: carbon and sulfur existed, positive electrode: NCA, carbon covering layer existed 100 nm, lower potential design was not employed

|  | $SiO_x$ x = | Change of $Si^{y+}$ | $Si^{0+}$ | $Si^{0+}$ amorphous | Shoulder peak in range of more than 1841 eV and 1845 eV or less | Capacity retention rate at $100^{th}$ cycle |
|---|---|---|---|---|---|---|
| Comparative Example 2-1 | 0.3 | None | — | — | None | 55 |
| Example 2-1 | 0.5 | Exist | Exist | Exist | Exist | 79 |
| Example 1-2 | 1 | Exist | Exist | Exist | Exist | 83 |
| Example 2-2 | 1.5 | Exist | Exist | Exist | Exist | 81 |
| Comparative Example 2-2 | 1.8 | — | — | — | None | Cannot evaluated |

The oxygen amount of $SiO_x$ was changed, and the evaluation results revealed insufficient oxidation and lower cycle performance when "x" was 0.3. When "x" was 1.8, the oxidation proceeded excessively to increase the resistance, and the battery could not be evaluated thereby.

Examples 3-1 to 3-6

Secondary batteries were produced and evaluated for the cycle performance under the same conditions as in Example 1-2 except for changing the median diameter of the negative electrode active material particles. The results are shown in Table 3.

TABLE 3

SiOx x = 1, copper foil: carbon and sulfur existed, $Si^{y+}$ was changed, $Si^{0+}$ amorphous existed, shoulder peak existed, positive electrode: NCA, carbon covering layer existed 100 nm, lower potential design was not employed

|  | Particle diameter μm | Capacity retention rate at 100th cycle |
|---|---|---|
| Example 1-2 | 5 | 83 |
| Example 3-1 | 0.3 | 78 |
| Example 3-2 | 0.5 | 80 |
| Example 3-3 | 1 | 81 |
| Example 3-4 | 10 | 84 |
| Example 3-5 | 20 | 81 |
| Example 3-6 | 30 | 78 |

When the particle diameter of the negative electrode active material particles was 0.5 μm or more, the surface was prevented from increasing, and the battery retention rate tended to be better thereby. When the particle diameter was 20 μm or less, the negative electrode active material particle became less expandable in charging and less breakable, thereby making it possible to improve the battery properties.

Examples 4-1 to 4-6

Secondary batteries were produced and evaluated for the cycle performance under the same conditions as in Example 1-2 except for changing the thickness of the carbon material. The results are shown in Table 4.

TABLE 4

SiOx x = 1, $D_{50}$ = 5 μm, copper foil: carbon and sulfur existed, $Si^{y+}$ was changed, $Si^{0+}$ amorphous existed, shoulder peak existed, positive electrode: NCA, lower potential design was not employed

| | Thickness of carbon covering layer nm | Capacity retention rate at 100th cycle |
|---|---|---|
| Example 1-2 | 100 | 83 |
| Example 4-1 | 0 | 77 |
| Example 4-2 | 5 | 79 |
| Example 4-3 | 50 | 81 |
| Example 4-4 | 200 | 84 |
| Example 4-5 | 1000 | 84 |
| Example 4-6 | 5000 | 83 |

The thickness of the carbon material was changed to evaluate the battery properties. As a result, without depositing a carbon material, the battery retention rate was lowered. It is presumed that carbon materials have effect to prevent decomposition of part of the electrolytic solution. The battery properties are stabilized when the carbon material increases the thickness, but it becomes difficult to improve the battery capacity as the carbon material becomes thicker. The battery capacity became difficult to improve when the thickness was about 5 μm (5000 nm). When the carbon material had a thickness of about 7 μm, the experiment less exhibited the capacity. Judging from these results as a whole, it is considered that the thickness of the carbon material is desirably 5 μm or less.

Example 5-1

A secondary battery was produced and evaluated for the cycle performance under the same conditions as in Example 1-2 except that the negative electrode current collector did not contain carbon or sulfur. The results are shown in Table 5.

TABLE 5

SiOx x = 1, $D_{50}$ = 5 μm, $Si^{y+}$ was changed, $Si^{0+}$ amorphous existed, shoulder peak existed, positive electrode: NCA, carbon covering layer existed 100 nm, lower potential design was not employed

| | Cupper foil: carbon, sulfur 100 ppm | Capacity retention rate at 100th cycle |
|---|---|---|
| Example 1-2 | Exist | 83 |
| Example 5-1 | None | 80 |

When the negative electrode current collector contained carbon and sulfur in each amount of 100 ppm by mass or less, the negative electrode was successfully prevented from deforming in charging. It was revealed that the battery retention rate was improved as a result.

Example 6-1

A secondary battery was produced and evaluated for the cycle performance under the same conditions as in Example 1-2 except that lower potential design was employed. The results are shown in Table 6. Specifically, the final voltage of the lithium ion secondary battery was set to 2.5 V in Example 1-2, and the final voltage of the lithium ion secondary battery was set to 3.0 V in Example 6-1.

TABLE 5

SiOx x = 1, $D_{50}$ = 5 μm, copper foil: carbon and sulfur existed, $Si^{y+}$ was changed, $Si^{0+}$ amorphous existed, shoulder peak existed, positive electrode: NCA, carbon covering layer existed 100 nm

| | Lower potential design | Capacity retention rate at 100th cycle |
|---|---|---|
| Example 1-2 | None | 83 |
| Example 6-1 | Exist | 86 |

When the final voltage of the inventive lithium ion secondary battery was set so as to use the inventive negative electrode in a region of lower negative electrode potential (e.g., the region in which the negative electrode discharging potential of Discharge curve A shown in FIG. 4 was 0.66 V or less, that is, the region in which the voltage of Discharge curve C was 3 V or more), the cycle performance was improved.

It is to be noted that the present invention is not limited to the foregoing embodiment. The embodiment is just an exemplification, and any examples that have substantially the same feature and demonstrate the same functions and effects as those in the technical concept described in claims of the present invention are included in the technical scope of the present invention.

The invention claimed is:

1. A negative electrode active material containing a negative electrode active material particle;
    the negative electrode active material particle comprising a silicon compound shown by $SiO_x$ (0.5≤x≤1.6),
    wherein the negative electrode active material particle contains $Si^{4+}$, and at least part of the $Si^{4+}$ is configured to be changed to at least one state selected from valence states of $Si^{y+}$ (y is any of 0, 1, 2, and 3) in occlusion of Li in the negative electrode active material, and
    the $Si^{y+}$ include $Si^{z+}$ (z is any of 1, 2, and 3) in a form of a Li compound after the occlusion of Li in the negative electrode active material.

2. The negative electrode active material according to claim 1, wherein the negative electrode active material particle is the one to form a state of $Si^{0+}$ by occlusion and release of Li in the negative electrode active material.

3. The negative electrode active material according to claim 2, wherein the $Si^{0+}$ is amorphous Si.

4. The negative electrode active material according to claim 1, wherein the negative electrode active material has at least one kind of shoulder peak in a range of an energy more than 1841 eV and 1845 eV or less in a XANES spectrum obtained by XANES measurement performed such that a first secondary battery having a negative electrode containing the negative electrode active material and a positive electrode containing a positive electrode active material is subjected to 100 cycles of charging and discharging, followed by disassembling the first secondary battery subjected to the charging and discharging, and producing a second secondary battery having the negative electrode subjected to the charging and discharging together with a counter electrode composed of metallic Li to set the second secondary battery to have an open-circuit potential of 2.0 V, and then the negative electrode is taken out from the second secondary battery and subjected to the XANES measurement.

5. The negative electrode active material according to claim 1, wherein the $Si^{y+}$ include $Si^{z+}$ (z is any of 1, 2, and 3), and the $Si^{4+}$ and the $Si^{z+}$ are to be reversibly changed to each other in the negative electrode active material particle in repeating of occlusion and release of Li in the negative electrode active material.

6. The negative electrode active material according to claim 1, wherein the negative electrode active material particle has a median diameter of 0.5 μm or more and 20 μm or less.

7. The negative electrode active material according to claim 1, wherein the negative electrode active material particle has a surface layer portion containing a carbon material.

8. The negative electrode active material according to claim 7, wherein the average thickness of the carbon material is 5 nm or more and 5000 nm or less.

9. A negative electrode comprising the negative electrode active material according to claim 1.

10. The negative electrode according to claim 9, further comprising:
a negative electrode active material layer containing the negative electrode active material, and
a negative electrode current collector,
wherein the negative electrode active material layer is formed on the negative electrode current collector, and
the negative electrode current collector contains carbon and sulfur, and each content is 100 ppm by mass or less.

11. A lithium ion secondary battery, comprising the negative electrode according to claim 9 as a negative electrode.

12. A method of using the lithium ion secondary battery according to claim 11, comprising:

setting a final voltage of the lithium ion secondary battery so as to use the negative electrode in a range of potential lower than the value at an inflection point formed near 0.7 V of a discharge curve obtained from a secondary battery having the negative electrode and a counter electrode composed of metallic Li.

13. A method of producing a negative electrode active material containing a negative electrode active material particle, comprising the steps of:
preparing negative electrode active material particles each containing a silicon compound shown by a general formula $SiO_x$ (0.5≤x≤1.6); and
selecting a negative electrode active material particle containing $Si^{4+}$ in which at least part of the $Si^{4+}$ is configured to be changed to at least one state selected from valence states of $Si^{y+}$ (y is any of 0, 1, 2, and 3) in Li occlusion in the negative electrode active material, and
the $Si^{y+}$ include $Si^{z+}$ (z is any of 1, 2, and 3) in a form of a Li compound after the occlusion of Li in the negative electrode active material.

14. A method of producing a lithium ion secondary battery, comprising:
producing a negative electrode using a negative electrode active material produced by the method of producing a negative electrode active material according to claim 13, and
producing a lithium ion secondary battery using the produced negative electrode.

* * * * *